Patented Aug. 22, 1944

2,356,581

UNITED STATES PATENT OFFICE 2,356,581

PROCESS OF PREPARING PENTONE ACIDS AND THEIR SALTS

Felix Grandel, Emmerich-on-the-Rhine, Germany; vested in the Alien Property Custodian No Drawing. Application November 26, 1940, Serial No. 367,301. In Germany November 28, 1939

2 Claims. (Cl. 195—47)

The present invention relates to a process for the preparation of pentone acids by transforming pentoses, such as arabinose, xylose, ribose and lyxose by means of oxidation, into the corresponding monocarboxylic acids or the salts thereof with the aid of bacteria of the Acetobacter genus or molds of the genera mucor and Aspergillus, and relates, further, to the processing of the compounds thus prepared, in order to obtain from such compounds and by known processes, wholesome salts of the pentone acids for pharmaceutical purposes.

It is old in the art to electrochemically prepare the corresponding acids from sugars by way of their oxidation, bromide of potassium and carbonate of calcium being available for this purpose. The further processing of the substances thus obtained is, however, very difficult in view of the presence of bromide of potassium. It is also old in the art to transform glucose, by bacterial methods, into gluconic acid by means of bacterium Acetobacter, Aspergillus or mucoraceae, the salts of which acid can be kept free of harmful admixtures. As far as applicant is aware, pentoses have never been treated in this manner. This is probably due to the fact that the biological characteristics of pentoses are entirely different from those of hexoses. For example, while hexoses are quickly and thoroughly fermented by baking yeast, no such fermentation takes place in the case of pentoses.

Applicant has now discovered that pentoses, upon intense aeration, are attacked by hyphomycetes of the Aspergillus and Mucor genera and bacteria of the Acetobacter genus, and in particular by *Acetobacter suboxydans*, in which cases concentrations of 20% are oxidised so as to furnish a 98% yield of the corresponding pentone acids, which acids, after having been neutralized by the addition of metallic carbonates or basic metal salts, can be immediately used as liquids suitable and effective for injection in metal therapeutics.

As sufficient quantities of pentoses are readily available in the wood saccharification industry where they are produced as intermediary extracts from the wood of deciduous or coniferous trees, the process of the present application possesses a particular technical importance.

In pharmacy, the use of pentone acids as substitutes for hexone acids possesses particular advantages. Experiments extending over a long period of time have been made, in order to render the non-readily soluble salts of the polycarboxylic acids, for example calcium gluconate, suitable for injections as supersaturated aqueous solutions containing a high percentage of said salts and which are not inclined to crystallize. A great number of compounds has been suggested as stabilizers for this purpose, but an ideal solution of this problem has not been found.

The present invention is based on the discovery that the salts of the pentone acids are readily soluble in water, and that the salts of the earthy alkaline earth cannot be caused to take on a crystalline form, even at the highest possible rate of concentration. It has been discovered by applicant that in consequence of the lower molecular weight of the pentone acids, the ratios of metallic ions are comparatively higher than, for instance, in the case of the hexone-acid salts. Only small quantities of applicant's product prepared in accordance with the present invention are needed for injection, and by its use a subcutaneous application, always desirable, is rendered possible without thereby causing pains at the place of injection.

The aqueous salt solutions of the pentone acids prepared by the bacterial method under the process of the present invention, can be immediately used for injections, after they have been purified with activated charcoal in a heated condition, and after a subsequent sterilization of such solutions.

In accordance with applicant's process, it is possible to prepare solutions for purposes of injection, which show an even higher degree of purity. For example, the pentone-acid salts can be isolated in a pure condition, by a precipitation from the thoroughly fermented sugar solutions with organic solvents, e. g. methyl alcohol, and by a reprecipitation, if necessary, whereupon they may be dissolved in water at the desired rate of concentration.

*Example*

750 g. of crystallized xylose are dissolved in 5 litres of water with an admixture of 0.05% of a nutritive salt solution consisting of 33% of $(NH_4)_2SO_4$, 33% of $KH_2PO_4$, 12% of $Ca(NO_3)_2$, 12% of $MgSO_4$, 0.2% of $FeCl_3$, and the solution thus obtained is aerated in a suitable vessel by frothing. Thereupon a suspension of *Acetobacter suboxydans* in water is admixed, and quantities of $CaCO_3$ added in the course of the testing period in accordance with the reduction of the sugar index figure. After the xylose concentration has been reduced to a lower percentage than 0.1%, the solution is filtered, and is boiled for 30 minutes with 5% of activated charcoal ("Norit"), is filtered again and, by dilution, is adjusted so as to show 20% of calcium xylonate (yield: 98%). This solution is then sterilized and can be used immediately in metal therapeutics for intramuscular, subcutaneous or intravenous injections.

A portion of the liquid which is clear, like water, is fed into cold methyl alcohol and is filtered in the cold condition, this operation being repeated after the residue has been dissolved in water. The residue which is now very fair, is dissolved in water so as to furnish a 50% calcium xylonate solution, which solution remains perfectly limpid even when kept for a prolonged period of time.

What I claim is:

1. In a process of preparing pentone acids and their salts, the steps of mixing xylose solution with suspension of *Acetobacter suboxydans*, aerating the solution, and combining the xylonic acid formed corresponding to the reduction in sugar contents with alkali metal salts.

2. In a process of preparing pentone acids and their salts, the steps of mixing xylose solution with a suspension of *Acetobacter suboxydans* and a nutritive saline solution, aerating the mixture, combining the resultant acid with calcium carbonate, filtering, the filtrate being precipitated by methyl alcohol and the precipitate dissolved in the desired proportion of water.

FELIX GRANDEL.